(12) United States Patent
Benton et al.

(10) Patent No.: US 6,440,478 B1
(45) Date of Patent: Aug. 27, 2002

(54) FEED BLOCK FOR ANIMALS

(75) Inventors: Alfred E. Benton, South Laguna; Chester D. Beintema, West Covina, both of CA (US)

(73) Assignee: K.E.S. Associates, Walnut, CA (US)

( * ) Notice: Subject to any disclaimer, the term of this patent is extended or adjusted under 35 U.S.C. 154(b) by 1313 days.

(21) Appl. No.: 08/755,150

(22) Filed: Nov. 22, 1996

Related U.S. Application Data

(63) Continuation of application No. 08/441,782, filed on May 16, 1995, now abandoned, which is a continuation of application No. 08/114,010, filed on Aug. 30, 1993, now abandoned.

(51) Int. Cl.[7] .................................. A23B 4/03
(52) U.S. Cl. ...................... 426/471; 426/233; 426/648; 426/658
(58) Field of Search ................. 426/471, 648, 426/233, 658

(56) References Cited

U.S. PATENT DOCUMENTS

| | | | |
|---|---|---|---|
| 1,983,434 A | | 12/1934 | Black et al. |
| 2,089,062 A | | 8/1937 | Hougland |
| 2,707,151 A | * | 4/1955 | Martin ........................ 426/471 |
| 3,057,739 A | * | 10/1962 | Forkner ...................... 426/471 |
| 3,103,439 A | * | 9/1963 | Williams .................... 426/471 |
| 3,698,911 A | | 10/1972 | Pellegrini |
| 3,880,668 A | | 4/1975 | Miller |
| 3,961,081 A | | 6/1976 | McKenzie |
| 4,749,578 A | * | 6/1988 | Benton et al. ................ 426/74 |

OTHER PUBLICATIONS

Peter J. Van Soest, Cornell University, (1982) Nutritional Ecology of the Ruminant, pp. 114–117.

* cited by examiner

Primary Examiner—John J. Gallagher
(74) Attorney, Agent, or Firm—Christie, Parker & Hale, LLP

(57) ABSTRACT

An improved feed block is produced by a novel process in which a fluid mixture comprising molasses, additives and other nutrients is produced into a dehydration vessel operating under a partial vacuum. The fluid mixture is heated to a temperature less than about 130° F. and agitated within the dehydration vessel to drive water from the fluid mixture. The water vapor is cooled, condensed and removed from the dehydration vessel to a condensate collector where the amount of water removed can be measured to determine the degree of dehydration. Once an appropriate amount of water has been removed, the dehydrated fluid mixture is produced from the dehydration vessel, formed into block shapes and cooled to form feed blocks. The resulting feed blocks are high in nutritional value because the low temperature dehydration process prevents the nutrients from being thermally destroyed.

22 Claims, 3 Drawing Sheets

FEED BLOCK FOR ANIMALS

This is a continuation of application Ser. No. 08/441,782, filed May 16, 1995, which is a continuation of Ser. No. 08/114,010, filed Aug. 30, 1993, both now abandoned.

BACKGROUND OF THE INVENTION

1. Field of the Invention

The field of the invention is a high energy feed supplement for use in the raising of cattle, horses, sheep and other livestock.

2. Description of the Prior Art

Feed supplements are generally made from molasses and other nutrients and are generally manufactured in the form of either a liquid feed supplement, or a solid block supplement known as a feed block. The present invention is directed to an improved feed block and the novel method and apparatus for making such a feed block.

A feed block is desirable in that when used to supplement an animal's diet, the animal's productivity can be improved significantly. Productivity includes factors such as weight gain, lactation and reproduction. A feed block also improves the animal's efficiency in digesting the forages that constitute the bulk of its diet. U.S. Pat. No. 3,961,081 to McKenzie and U.S. Pat. No. 4,749,578 to Benton and Patrick disclose prior art feed blocks and the methods and apparatus for making them. These patents are incorporated herein by reference. The present invention relates to a novel method for making an improved feed block.

The McKenzie patent teaches a method of making a feed block which is intended to be non-porous, hard and vitreous. A fluid feed mixture of molasses and other nutrients is heated at ambient pressure to between about 225° F. and about 300° F. to remove the bulk of the water from the mixture. The partially dehydrated mixture is then subjected to a vacuum without additional heating to further dehydrate the mixture. This two-step process was necessary to promote a high degree of dehydration without causing foaming of the mixture. The fully dehydrated mixture is then formed into the desired shape and cooled to produce a feed block.

While the McKenzie patent represented a significant improvement in the area of feed block manufacturing, its shortcomings led to the development of the Benton-Patrick feed block and method for making feed block as disclosed in the Benton-Patrick patent. One such shortcoming that the Benton-Patrick invention overcame is that the blocks produced by the method of the McKenzie patent tend to be porous and hygroscopic, causing them to absorb atmospheric moisture. Once the McKenzie blocks absorb moisture, they soften and become sticky making them difficult to handle and causing a loss of consumption control.

The feed blocks of the Benton-Patrick patent are an improvement over the McKenzie blocks. The Benton-Patrick blocks are water resistant, non-porous, hard, and vitreous feed blocks that do not tend to soften or become sticky when exposed to atmospheric moisture. By the method of the Benton-Patrick patent, a mixture of molasses and about 1% to about 2% by weight of insoluble soap are first heated at ambient pressure to between about 225° F. and 300° F. to drive off most of the water present. The partially dehydrated mixture is subjected to a vacuum to drive off most of the remaining water in the mixture. The fully dehydrated mixture is then formed into feed blocks and allowed to harden. Other nutrients can also be added to the molasses and soap mixture prior to the heating step, and/or to the dehydrated mixture prior to forming it into blocks. The improved properties of the Benton-Patrick feed block are attributed to the initial addition of insoluble soap which provides the improved water resistant characteristics for the feed block produced.

Despite the improved water resistant characteristics of the Benton-Patrick feed block, even it has certain shortcomings. It is well known that when sugars such as those found in molasses are subjected to heat, some degradation of the sugars occurs. Thermal degradation can also be expected when other nutrients such as proteins, fats, carbohydrates and vitamins are subjected to heat. In producing feed block by prior art methods, a significant portion of the nutritional value of the ingredients that make up the feed block is destroyed by the formation of reaction products that are often indigestible to the animals that eat the feed block. One such thermal degradation reaction that destroys carbohydrates is known as the Maillard reaction. This particular reaction involves the chemical reaction of carbohydrates with amino acids and water to form a generally indigestible polymer. The Maillard reaction is particularly undesirable in the production of feed block.

Heat and moisture are known to increase the rate of these degradation reactions. An improved feed block and a method and apparatus for making such a feed block are desired where the loss of nutrients by thermal degradation is reduced.

Vacuum dehydration of molasses is also generally known in the prior art, but has typically been avoided due to foaming and swelling of the molasses which make its handling extremely difficult.

SUMMARY OF THE INVENTION

The present invention provides an improved feed block with a higher proportion of nutrients than are contained in prior art feed blocks. The improved feed block is produced by a novel process and apparatus in which the ingredients for the feed block are dehydrated at low temperature and pressure in order to avoid the undesirable thermal degradation reactions which are responsible for the destruction of a portion of the nutrients in prior art feed blocks. By careful control of process conditions which include time, temperature, pH, and degree of dehydration, the disadvantages of prior art dehydration processes can also be avoided.

In the novel process and the novel production apparatus, a fluid mixture comprising molasses and other nutrients and additives is fed into a dehydration vessel. The dehydration vessel operates at a partial vacuum and includes an internal mixer and an external recycle pump both of which help to agitate the fluid mixture. A heating section in a lower portion of the dehydration vessel is used to heat the fluid mixture to a temperature that is preferably less than about 130° F. in order to drive the water from the fluid mixture. A cooling section in an upper portion of the dehydration vessel is used to condense the water vapor driven from the fluid mixture by the heating section. The condensed water is collected in a drip pan and flows to a condensate collector where the amount of condensate can be measured to determine the degree to which the fluid mixture has been dehydrated. As the fluid mixture is dehydrated, the rates of the Maillard and other thermal degradation reactions slow. Once the desired degree of dehydration has been achieved, the dehydrated mixture is removed from the dehydration vessel so that it can be formed into block shapes and cooled.

BRIEF DESCRIPTION OF THE DRAWINGS

The invention will be more specifically described in connection with the accompanying drawings in which.

DESCRIPTION OF THE INVENTION

Figure 1:
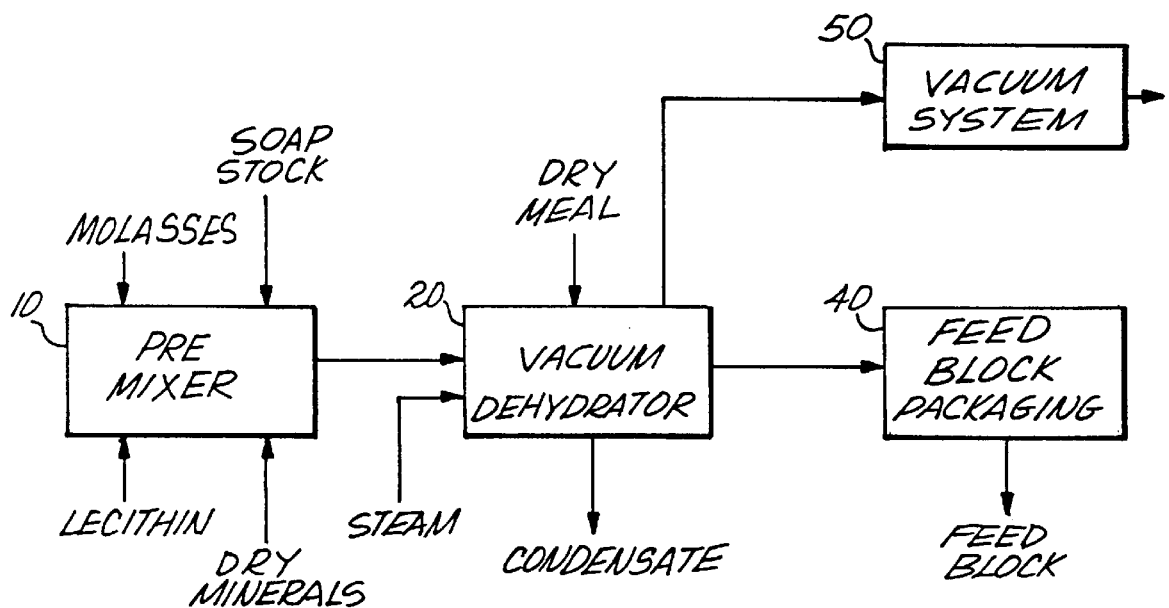
FIG. 1 is a flow sheet illustrating one embodiment of the present invention.

To prepare the improved feed block of the present invention, the individual ingredients are first fed into a scale-mounted premixer as depicted by numeral 10 in FIG. 1. The individual ingredients preferably include molasses, soap stock, lecithin, vitamins and dry minerals. Of these ingredients, molasses generally comprises the bulk of the mixture, and can comprise the entire mixture if desired.

The addition of soap stock is desirable because it contains free fatty acids which can combine with saponifying agents found in the dry minerals to form an insoluble soap. The resulting insoluble soap is useful in producing a hard, more water-resistant feed block. The soap stock is preferably an acidulated soap stock having a pH between about 4 and about 4.5. Soap stock obtained from cottonseed oil or soybean oil that contains about 70–80% free fatty acids, 5% water and 20–30% triglycerides is most preferred. These soap stocks are preferred because they are readily available and relatively less expensive than other soap stocks. However, any acidulated soap stock from a vegetable oil containing free fatty acids may be employed.

The lecithin that may be added is preferably a commercial grade lecithin that contains about 60–70% pure lecithin and 30–40% fatty acids. The fatty acids from the commercial lecithin and the fatty acids from the soap stock together provide about 1–2% fatty acids for the entire mixture. Lecithin provides multiple benefits to the block's physical nature and nutritional qualities. It reduces the stickiness of the molasses compound and minimizes build-up on the various components of the apparatus. It also provides highly available phosphorus, significant vitamin concentrations of choline and inositol with small amounts of tocopherols and biotin. Furthermore lecithin is a strong emulsifying agent and antioxidant, it aids in the mixing of sugars with the fats and prevents graining of the sugars within the mix, forming a more desirable crystal.

The dry minerals that may be added preferably contain a bivalent base or bases in an amount sufficient to saponify the fatty acids and form the insoluble soap. The dry minerals also help control the pH of the mixture by both raising the pH and by acting as a buffer. The pH of the mixture is preferably controlled within the range of about 7.5 to 9.5 to accelerate dehydration of the mixture and reduce the thermal decomposition of the sugars present in the molasses. Useful bivalent bases include calcium hydroxide (hydrated lime), magnesium hydroxide, or any other base that is nutritionally compatible with the feed and that will not injure the animals which feed upon it.

It has been found that when lime is added to the soap stock, lecithin and molasses mixture, some of the lime forms lime sugar complexes which cause the sugar to become hydrophobic, making it more easily release the associated water during dehydration. By controlling the pH of the mixture within the preferred range, the hydrophobic properties can be optimized. For a typical beet molasses which has a pH from about 6.5 to over 8, a pH for the mixture as high as 9.5 may be required for optimal dehydration. For cane molasses which generally has a pH of about 5.5, controlling the pH of the mixture between about 7.5 and 8.6 is optimal. Further benefit is provided by controlling the pH of the mixture in that sucrose is quite stable at a pH above about 7, and can withstand higher temperatures without thermal destruction which often occurs at a lower pH.

However, if an excessive amount of lime is added, sugars may be destroyed forming acids which lower the pH and cause further inversion of sucrose. These reactions generally occur at a pH in the range of about 10 to 12. While such reactions with sucrose are undesirable, they are reversible and by reducing the pH, the acid formed can be reversed back to form sucrose.

If a high pH molasses is used, such as high pH beet molasses, it may be necessary to add an acidifier to the mixture to bring its pH to the desired range of 7.5 to 9.5, for example. If the addition of an acidifier is necessary, it is preferred that the acidifier have some nutritional value.

The preferred dry minerals are hydrated lime (calcium hydroxide), limestone flour (calcium carbonate), magnesium oxide and zinc oxide. It is important that dry minerals with bivalent bases be used because saponification agents with monovalent bases will not produce insoluble soaps. Insoluble soaps are preferred because their use results in a more water resistant feed block. A feed block containing soluble soaps tends to absorb atmospheric moisture and softens too easily with time.

As an alternative to adding fatty acids and saponifying agents to react and form insoluble soaps, these reactants may be replaced by insoluble soaps which are added directly to the mixture. In order to more cost-effectively produce a water-resistant feed block, it is preferred to produce the insoluble soap in situ.

Furthermore, by producing the insoluble soap in situ, it is easier to control the pH of the mixture. If a low pH molasses such as high brix cane molasses which has a pH between about 5 and 5.5 is used, the pH of the mixture is raised to a more appropriate level by adding additional dry minerals which are basic.

Figure 2:
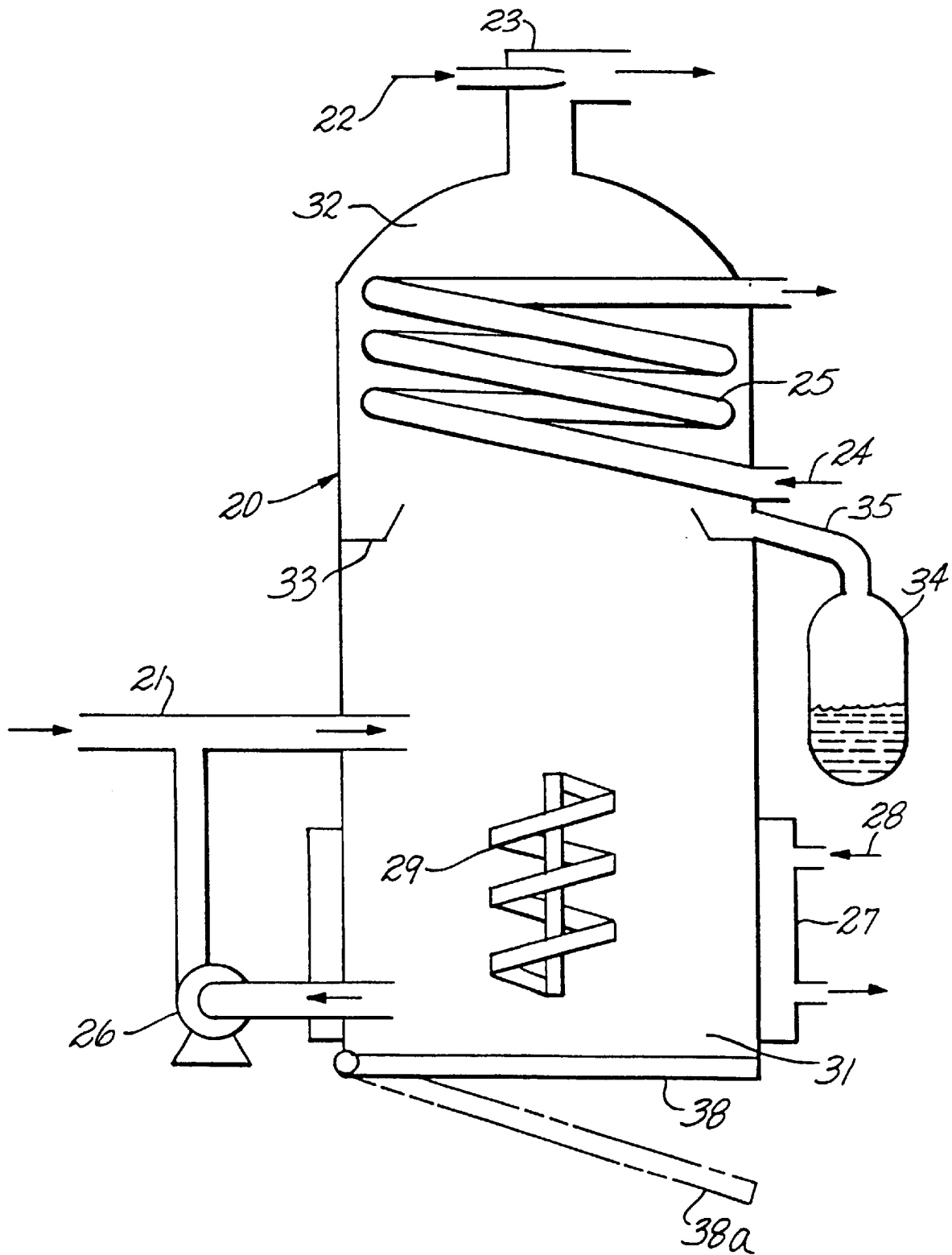
FIG. 2 is a schematic drawing illustrating a vacuum dehydrator of the present invention.

The raw ingredients are thoroughly mixed into a fluid mixture in the premixer before being pumped into the vacuum dehydrator 20. The dehydrator is generally a vertically oriented cylindrical vessel. The dehydrator and its internals are illustrated schematically in FIG. 2. Steam is first injected into the dehydrator to purge the ambient air from the vessel. The fluid mixture then enters the dehydrator at feed nozzle 21. Once the mixture has been pumped into the dehydrator, steam 22 is introduced to the steam ejector 23 to initiate a vacuum in the dehydrator. Cooling water 24 is introduced to cooling coils 25 which are located in an upper portion of the dehydrator.

From the steam ejector, the exhaust steam and other gases drawn from the dehydration vessel are extracted to vacuum system 50. The vacuum system comprises means for drawing a vacuum on the exhaust from the steam ejector as is well known in the art.

A progressive cavity recycling pump 26 draws a portion of the fluid mixture from the lower part of the dehydrator and recycles the mixture to help keep the ingredients well mixed. The agitation provided by the recycle pump also encourages dehydration by increasing the exposure of the fluid mixture to vapor as the fluid mixture returns to the vessel above the feed mixer.

The lower part of the dehydrator also includes a steam jacket 27 into which heating steam 28 is introduced to heat the fluid mixture and drive moisture from it. The flow of steam to the steam jacket is initially controlled to maintain the fluid mixture at less than about 180° F., preferably less than 150° F. and most preferably less than about 130° F. in order to minimize the undesirable Maillard and other thermal degradation reactions while maintaining the mixture in a fluid state.

The fluid mixture is further mixed by a ribbon mixer 29 located inside the lower section of the dehydrator. The ribbon mixer is preferably mounted so that it forces the mixture down along the walls of the dehydrator and up through the center of the mixture. By keeping the mixture moving along the walls of the dehydrator, the temperature of the mixture is more uniformly controlled and no hot spots will develop along the walls of the dehydrator.

In general, the lower section of the dehydrator acts as a heating section 31 in which water is driven from the fluid mixture. The upper section is a cooling section 32 in which the water vapor driven from the fluid mixture is condensed and recovered. A drip pan 33 is located within the cooling section below the condensing coils. The drip pan is shaped to fit against the inner circumference of the dehydrator to collect the water condensate that forms as the water vapor condenses on the surface of the cooling coils. The condensate from the drip pan flows to a condensate tank 34 by gravity through a conduit 35. When the vacuum reaches about 29 inches of mercury, the steam ejector and the vacuum system can both be shut off if the vessel is vacuum-tight. The condenser then removes water vapor and allows rapid transfer of the moisture to the condenser.

Figure 3:
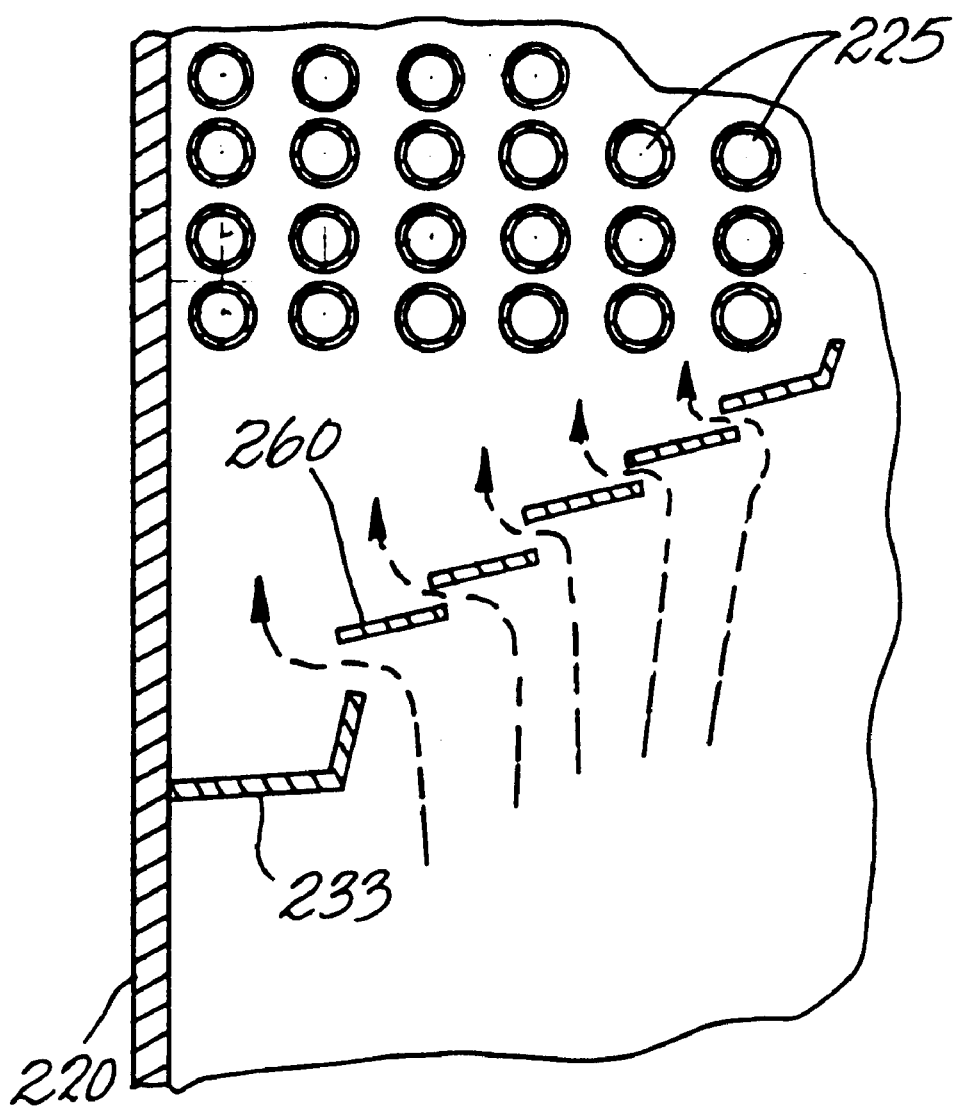
FIG. 3 is a sectional view of a preferred embodiment of a dehydrator.

In a preferred embodiment of the dehydrator as illustrated in FIG. 3, a plurality of cooling coils 225 are used to increase the surface area for condensation and improve water removal. Below the cooling coils are a plurality of baffle rings 260 placed concentrically about the central axis of the dehydrator. Each baffle ring has an outwardly sloped upper surface and the rings are arranged in steps so that as water drips from the cooling coils down to a ring, it flows downwardly along the ring, cascading to the next ring. The water from the outermost ring flows into the drip pan 233. By this arrangement, the condensate can be effectively collected from a number of coils without substantially decreasing the vapor flow within the dehydrator, the vapor flow being illustrated by the broken lines of FIG. 3. Furthermore, because a portion of the vapor flows through the cascading water, there is better contact between vapor and liquid which further promotes condensation.

Once a vacuum of about 29 inches of mercury has been achieved, heating and cooling continue to be added to the lower and upper sections of the dehydrator taking care to maintain the lower section at less than about 130° F. These conditions are preferably maintained while the mixture is circulated until the moisture content of the mixture has been reduced to about 2–3% by weight. However, since the Maillard reaction and other thermal degradation reactions are generally inhibited by the absence of water, the temperature can be allowed to increase after dehydration. In the preferred embodiment, the temperature is maintained at less than about 130° F. for the entire dehydration.

The water content of the feed block is controlled by monitoring the amount of water removed such as by measuring the level of water in the condensate tank. By determining the total moisture content of the raw materials fed into the dehydrator and determining the amount of water in the condensate tank, the level of dehydration can be calculated.

When the water content of the fluid mixture has been reduced to the desired level which generally takes about 15 minutes, the recycle pump is shut off. Additional dry meal and other nutrients can then be vacuumed into the vessel through the feed nozzle 21. The dry meal is preferably fed from a scale hopper to control the amount added. A screw conveyor or other means can also be used to assist the flow of dry meal into the dehydrator. The flow of water through the condenser coils can be reduced or stopped altogether in order to stop the dehydration.

Once the proper level of dehydration has been achieved, acidifier can be added to the mixture to lower the pH to a preferred range of between about 6 and 7. The most preferred range is between 6.2 and 6.8. This acidification step stops the reaction that forms the lime sugar complex. The sugars also become soluble again which allow them to pick up the small amount of water that remains, reducing the viscosity of the mixture.

At this point in the process, the temperature of the mixture can be allowed to exceed 130° F. without significantly destroying nutrients. This is because once the mixture has been sufficiently dehydrated, the rates of the Maillard and other thermal degradation reactions are significantly reduced in spite of the greater heat. Therefore, steam can still be added to the heating section of the dehydrator without a loss of nutrients. However, as the heat added by the steam is no longer being removed by the condenser, the temperature and steam addition should be monitored closely to prevent overheating of the dehydrated mixture. A temperature of between 155–170° F. is preferred as it keeps the mixture in a fluid state with a sufficiently low viscosity to allow the mixture to flow so that the feed mixture can be readily removed from the dehydrator and sent to a feed block packaging unit, as explained later. Also at this time, the ribbon mixer 29 continues to operate to keep the various ingredients well mixed. At the completion of the mixing step which takes approximately 7 minutes, the ribbon mixer is shut down, the vacuum is broken, and the mixture is dropped through a drop door 38 located at the bottom of the dehydrator. The drop door is hinged at one side and is shown in an open position as drop door 38a which appears in phantom. Once the drop door is opened, the ribbon mixer can be restarted to help push the dehydrated mixture out of the dehydrator.

From the drop door, the mixture is introduced to a feed block packaging unit 40 as is well known in the art. Here the mixture is formed into block shapes and cooled. The blocks harden to form high quality feed blocks which are used to supplement an animal's diet. Livestock can lick the block so as to release the nutrients slowly. Because the block is hard and water resistant, the consumption of the block is slow. This prevents the animal from overeating the block. It is important to recognize that a feed block such as is made by the improved process disclosed, is meant to supplement, and not replace the animal's normal diet.

There are several benefits achieved by this improved, low temperature dehydration process. As indicated above, the nutritional value of the resulting feed block is higher than with feed block produced by prior art methods. By dehydrating the liquid mixture in a low temperature vacuum, the Maillard reaction and other thermal degradation reactions, responsible for destroying a portion of the nutrients in prior art feed blocks, can be significantly reduced. As a result, a feed block that is higher in nutrients can be produced. Higher levels of nutrients make the feed block more efficient and less feed block is needed. The improved efficiency of the feed block can be measured by increased weight gain, increased lactation and higher reproduction by the animals to which it is provided.

The improved process also provides additional benefits in that the quality of the resulting block is easier to control with much greater consistency than was previously possible. In a process in which a molasses mixture is dehydrated at atmospheric conditions, it is much more difficult to control the degree of dehydration than it is by the improved process. In an atmospheric process, atmospheric conditions such as temperature and humidity can affect the temperature and time necessary to dehydrate the mixture. Furthermore, in the prior art, the moisture is released to the atmosphere making it difficult to determine how much water has been removed. Under the process of this invention, the dehydration takes place in a closed system in which the amount of water removed from the mixture can be easily and accurately measured. The end result is a feed block that is of a predictable and consistent high quality.

The improved process is also a more energy efficient way to make feed block. Because it operates at lower temperatures and uses a closed system, energy requirements are significantly reduced. The water collected by the condenser can also be used to supplement the water evaporated from a cooling tower such as is necessary to provide the cooling needed for practicing the process. It is estimated that the improved process uses about 50% less energy than prior art processes.

It has also been found that a prior art dehydrator can be made to operate more efficiently and produce a higher quality feed block by the use of an internal condenser and drip pan. In the prior art dehydrators, there tends to be some moisture condensation on the walls of the vent stack. This condensation generally drips back into the dehydrator. In order to overcome this counterproductive recycling of the condensate, higher temperatures and longer dehydration cycles are generally required in the prior art. By intentionally condensing the water vapor, collecting the condensate, and withdrawing it from the dehydrator, as is done in a preferred embodiment of the invention, a dehydrator with little or no vacuum can be made to operate more efficiently than in the prior art.

Finally, because the improved process is simple to operate and uses just a single dehydration vessel rather than a series of cookers and vacuum tanks, operating conditions can more easily be varied as desired to produce a customized product. Fish proteins, amino acids, surfactants, vitamins, minerals and other supplements can be added with little, if any, loss in their nutritional value. Such feed blocks can be tailored to the needs of individual animals, forage deficiencies, and soil and water conditions.

What is claimed is:

1. A method for making feed blocks comprising the steps of:
    introducing a fluid mixture comprising molasses and other nutrients into a dehydration vessel having a heating section;
    adjusting the pH of the fluid mixture to between 7.5 and 9.5 by the addition of a base containing a bivalent metal ion;
    subjecting the dehydration vessel to a partial vacuum;
    agitating the fluid mixture;
    heating the fluid mixture in the heating section of the dehydration vessel to a temperature of less than about 180° F. while subject to the partial vacuum for a sufficient time to drive water from the fluid mixture and form a dehydrated mixture and water vapor; and
    forming the dehydrated mixture into feed blocks.

2. The method of claim 1 wherein the dehydration vessel further includes a cooling section and the method further comprises the steps of:
    applying sufficient cooling to the cooling section to condense the water vapor and produce condensed water; and
    collecting the condensed water.

3. The method of claim 2 further comprising the step of measuring the amount of condensed water produced to determine the water content of the dehydrated mixture.

4. The method of claim 1 wherein the fluid mixture in the heating section of the dehydration vessel is heated to less than about 130° F.

5. The method of claim 4 wherein the heating step comprises:
    a first heating step in which the fluid mixture is heated to a first temperature, and;
    a second heating step wherein the fluid mixture is further heated to a second temperature that is higher than the first temperature.

6. The method of claim 5 wherein the second temperature is less than about 180° F.

7. The method of claim 1 wherein the dehydration vessel is subjected to a vacuum of about 29 inches of mercury.

8. The method of claim 1 wherein sufficient heat is provided for a sufficient time to produce a feed block comprising less than about 3% water by weight.

9. The method of claim 1 further comprising the step of mixing molasses, soap stock, lecithin and dry minerals to form the fluid mixture.

10. The method of claim 1 further comprising the step of reducing the pH of the dehydrated mixture to between about 6.2 and 6.8 before forming the feed blocks.

11. A method for making feed block comprising the steps of:
    providing a fluid mixture comprising molasses into a dehydration vessel having a heating section and a cooling section;
    adjusting the pH of the fluid mixture to between 7.5 and 9.5 by the addition of a base containing a bivalent metal ion;
    subjecting the dehydration vessel to a partial vacuum;
    agitating the fluid mixture;
    heating the fluid mixture in the heating section of the dehydration vessel to a first temperature of less than about 150° F. while subject to the partial vacuum to drive water from the fluid mixture and form a partially dehydrated mixture and water vapor;
    applying sufficient cooling to the cooling section to condense the water vapor and produce condensed water;
    removing the condensed water from the dehydration vessel;
    heating the fluid mixture in the heating section to a second temperature of less than about 220° F. to liquefy the partially dehydrated mixture and form a final dehydrated mixture; and
    forming the final dehydrated mixture into feed blocks.

12. The method of claim 11 wherein sufficient heating is provided for sufficient time to form a feed block comprising less than about 3% water by weight.

13. The method of claim 11 wherein the dehydration vessel is subjected to a vacuum of about 29 inches of mercury.

14. The method of claim 11 further comprising the step of adding an insoluble soap to the fluid mixture.

15. The method of claim 11 further comprising the step of adjusting the pH of the dehydrated mixture to between about 6.2 and 6.8.

16. The method of claim 11 further comprising the step of adding a fatty acid and a divalent base to the fluid mixture to form an insoluble soap.

17. The method of claim 16 further comprising the step of adjusting the pH of the dehydrated mixture to between about 6.2 and 6.8.

18. The method of claim 11 wherein the first temperature is less than about 130° F. and the second temperature is less than about 180° F.

19. The method of claim 11 further comprising the step of adding supplemental nutrients to the fluid mixture.

20. The method of claim 19 wherein the supplemental nutrients comprise dry meal.

21. A method for making feed block comprising the steps of:

providing a fluid mixture comprising molasses into a dehydration vessel having a heating section and a cooling section;

adjusting the pH of the fluid mixture to between 7.5 and 9.5 by the addition of a base containing a bivalent metal ion;

agitating the fluid mixture;

heating the fluid mixture in the heating section to a temperature less than about 180° F. to drive water from the fluid mixture and produce a dehydrated mixture;

applying sufficient cooling to the cooling section to condense the water vapor and produce condensed water;

collecting and removing the condensed water from the dehydration vessel; and forming the dehydrated mixture into feed blocks.

22. The method of claim 21 further comprising the step of subjecting the dehydration vessel to a partial vacuum during the heating step.

* * * * *